United States Patent [19]

Thomsen

[11] 4,142,064
[45] Feb. 27, 1979

[54] STRAIN RELIEF BUSHING

[75] Inventor: Jack W. Thomsen, La Grange Park, Ill.

[73] Assignee: Weckessar Company, Inc., Ill.

[21] Appl. No.: 807,249

[22] Filed: Jun. 16, 1977

[51] Int. Cl.² .......................... H01B 17/26; F16L 5/00
[52] U.S. Cl. ................................... 174/153 G; 248/56
[58] Field of Search ............... 174/65 G, 135, 152 G, 174/153 G, 155; 16/2; 248/56; 339/103 B, 105, 107

[56] References Cited

U.S. PATENT DOCUMENTS

| 27,977 | 4/1860 | Fox | 174/155 |
|---|---|---|---|
| 2,277,637 | 3/1942 | Eby | 174/153 G |
| 2,420,826 | 5/1947 | Irrgang | 174/153 G |
| 3,123,662 | 3/1964 | Fink | 174/155 X |
| 3,217,319 | 11/1965 | Rueger | 174/153 G X |
| 3,288,407 | 11/1966 | Downer et al. | 174/153 G X |
| 3,424,856 | 1/1969 | Coldren | 174/153 G |
| 3,464,659 | 9/1969 | Klumpp, Jr. et al. | 248/56 |
| 3,502,917 | 3/1970 | Bizoe | 174/153 G X |
| 4,002,822 | 1/1977 | Kurosaki | 248/56 X |
| 4,034,944 | 7/1977 | Moran | 174/153 G X |

Primary Examiner—Laramie E. Askin

[57] ABSTRACT

A split self-locking strain relief bushing for electrical conductors for cables and the like, comprising cooperative sections adapted to be fitted one onto the other and upon the cable to be secured thereby through longitudinal slidable movement therebetween and with each section providing restraining structure whereby in assembled condition it is locked in place within a receiving aperture formed in a support member.

4 Claims, 8 Drawing Figures

STRAIN RELIEF BUSHING

SUMMARY OF THE INVENTION

Strain relief bushings of this type are used in connection with various electrical appliances and apparatuses to relieve strain upon the electrical conductor wires and cables during manufacture and use.

The most commonly used strain relief bushing consists of two cooperating sections, with each section having corresponding mating structure joining the sections into a single integral unit. The assembly of these prior art strain relief bushings has been laborious in requiring the use of special tools. Also the assembly has been one that severely crimps the cables and wires, making disassembly even more difficult.

The present invention is related to an improved "straight-through" strain relief bushing. The bushing provides a protective housing fabricated out of a molded plastic dielectric material through which an electrical line cable or wire may be insulated while passing through a panel or support member. It is a strain relief bushing that may be easily assembled without the use of special tools, and one which does not severely crimp the conductor cable or wires and which may be easily disassembled if it is necessary to do so, but which will not become accidentally disassembled when in use.

GENERAL DESCRIPTION

The strain relief bushing of this invention is shown in the accompanying drawings which illustrate the preferred form of construction by which the objects of the invention are achieved, and in which.

Figure 2:
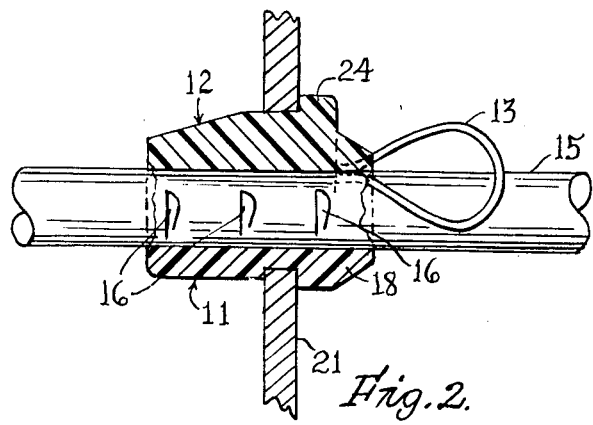
FIG. 2 is a fragmentary sectional detail view of the strain relief bushing of this invention.

In referring to the drawings, the improved strain relief bushing 10 is composed of two parts, namely, a restraining body 11 and a wedging body 12. Each of the bodies is adapted to be joined together by a flexible web strip 13, with the web strip 13 being of such length that it may be formed into a loop when the body sections 11 and 12 are mounted together in a manner hereinafter described.

Figure 1:
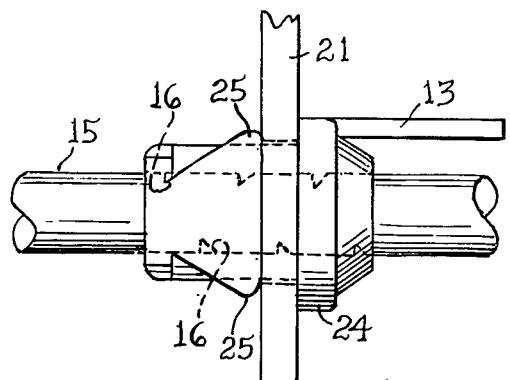
FIG. 1 is a plan view of the strain relief bushing of this invention in its assembled condition wherein it has mounted an electrical conductor in insulated relation to a supporting structure.

The restraining body 11 is formed generally U-shaped so as to provide an axially extending open trough 14 in which the electrical cord or cable 15 is laid. The open trough 14 is periodically interrupted by a series of ribs 16 which are formed in the side walls of the trough 14 and which are tapered throughout their length so as to narrow the trough 14 at the bottom 17 of the body 11. These ribs 16 are axially staggered with respect to each other, as shown in FIG. 1, so that the electrical cord 15 when passing therethrough will assume a serpentine path through the bushing.

The restraining body 11 provides a semi-annular flange 18 which will act as a restraining collar when the restraining body 11 is projected through an aperture 20 formed in a panel or support member 21. A recess 19 is formed partially throughout the peripheral edge of the body 11 and will receive therein a portion of the wall of the panel 21 defining the aperture 20, with the recess cooperating with the collar 18 to retain the restraining body 11 in the aperture 20 during assembly.

It should be noted that the top edges of the side walls of the restraining body 11 provide longitudinally extending ribs 22 for a purpose hereinafter made apparent.

Figure 7:
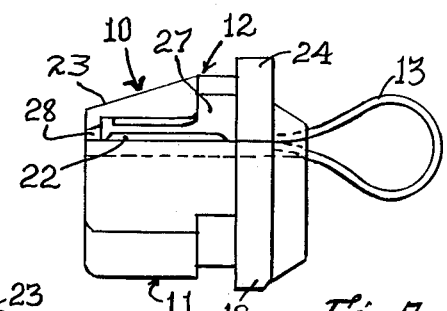
FIG. 7 is a side elevational view of the strain relief bushing in assembled condition.
Figure 6:
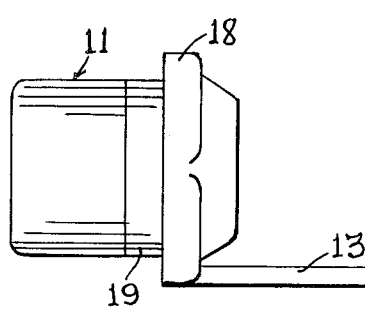
FIG. 6 is a top plan view of the strain relief bushing in an unassembled condition.
Figure 8:
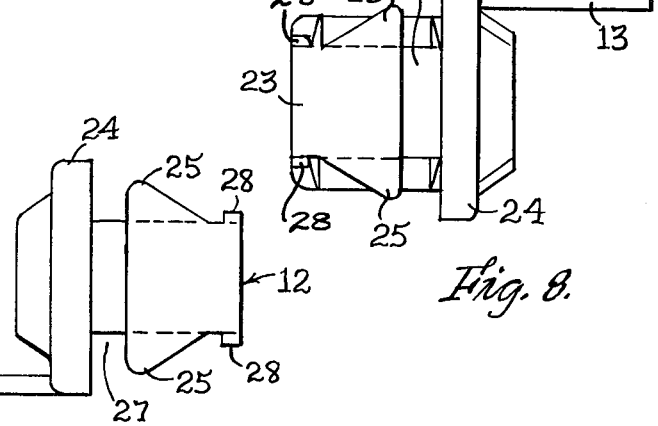
FIG. 8 is a top plan view of the strain relief bushing in assembled condition.

The complementary portion of the bushing 10 is a wedging body 12. This wedging body 12 is generally semicircular in cross section and has a portion of its top wall tapered as at 23. The wedging body 12 provides at one end a semicircular radially extending restraining collar 24 which is complementary to the semi-annular flange 18 provided by the restraining body 11 so as to form a complete circular collar, as seen in FIGS. 1, 7 and 8. The wedging body 12 is provided with a pair of arcuate wing tabs 25 extending outwardly of the sides of the tapered top wall 23 and spaced inwardly from the collar 24 so as to provide therebetween a wall-receiving recess 27. To the rear of the inner ends of the wing tabs 25 and adjacent to the end of the tapered wall 23 are a pair of oppositely extending laterally projecting detents 28, the purpose and function of which will be hereinafter made apparent.

Figure 3:
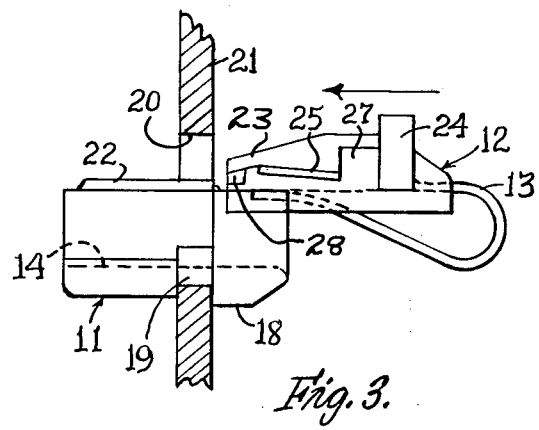
FIG. 3 is a fragmentary side elevational view of the invention during one step of its assembly.
Figure 4:
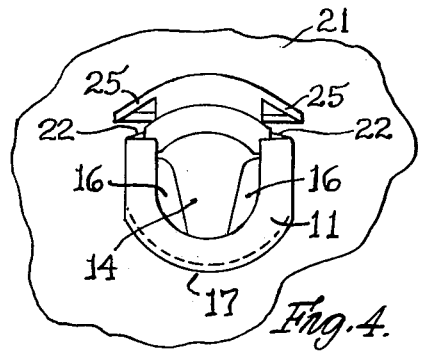
FIG. 4 is a rear elevational view of the assembled strain relief bushing without a wire cable or conduit therein.
Figure 5:
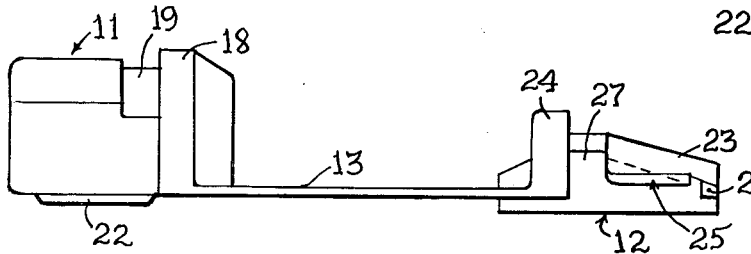
FIG. 5 is a side elevational view of the strain relief bushing in an unassembled condition.

In assembly, the restraining body 11 is placed in the aperture 20 provided by the panel or support member 21. The line cord or wire 15 is journalled therein and sits in the open trough 14 provided thereby. The wedging body 12 is then placed upon the cord 15 and moved in the direction of the arrow as shown in FIG. 3. The tapered top wall 23 of the wedging body will engage the wall defining the aperture 20 in the panel 21 and will cam the wedging body 12 in a downward direction upon the restraining body 11 as well as the line cord 15. During the passing of the wedging body 12 through the aperture 20, the wing tabs 25 will be flexed downwardly at their extremities until they pass beyond the wall of the panel 21, at which time they will assume their normal condition and cooperate with the collar 24, which will then have engaged the opposite surface of the wall of the panel 21, securing the bushing 10 in place. The detents 28 formed at the end of the wedging body 12 will ride upon the ribs 22 formed on the edges of the wall of the restraining body 11 and will snap behind the same to maintain the proper alignment of the two parts of the bushing when so assembled in the manner shown in FIG. 7.

As the wedging body 12 is forced into the aperture 20 formed in the panel 21, the underside of its arcuate part 23 will cause the line cord 15 to be depressed into the narrow trough 14 and be gripped by the ribs 16 formed in the inner walls of the restraining body 11. As the ribs 16 are staggered or offset throughout the trough 14, the gripping action thereof on the cord 15 will force the same into a serpentine configuration, but, since the trough 14 is generally straight through, the line cord 15 will not be disfigured or damaged, but will be securely restrained therein.

If it is not desired to use the web strip 13, it can be clipped off and the two bodies 11 and 12 separated either before or after assembly. If it is retained, the web strip 13 will provide a convenient loop for attaching instructions or warning tags to the device or apparatus on which the strain relief bushing is assembled.

From the foregoing, it is apparent that I have constructed an effective strain relief bushing which comprises two body sections, each performing specific functions. The restraining body 11 provides a gripping means in a tapered trough 14 to retain the line cord in the bushing, and also a means whereby the restraining body 11 is secured in the aperture 20 formed in the panel 21; the wedging body 12 slides along the line cord during assembly, forcing it into retaining engagement with the ribs 16 in the tapered trough 14 and also locks the strain relief bushing onto the panel 21.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A strain relief bushing of molded plastic dielectric material adapted to insulate an electric cord while being contained within a complementary circular aperture formed in a supporting panel wherein the improvement comprises:
   (a) a U-shaped body of a size to be positioned in a portion of the circular aperture formed in the supporting panel and provided with an axially extending cord receiving trough,
   (b) a wedge member arcuated throughout its length and adapted to be placed upon the cord when held in the trough of said U-shaped body and slidably moved upon the free ends of said U-shaped body and into the remaining opening portion of the circular aperture formed in the supporting panel,
   (c) said arcuated wedge member having a front to rear tapered top wall supporting a pair of radially extending arcuated and tapered flexible wing tabs having a portion of their extremities extending over and beyond the free ends of said U-shaped body portion,
   (d) said wing tabs resiliently flexing in a downward direction about said arcuated wedge member as the same is slidably moved upon the cord held in said trough provided by said U-shaped body and into the circular aperture with said tabs engaging behind the wall defining such aperture so as to restrict withdrawal of the strain relief bushing out of such circular aperture, and
   (e) a plurality of barbs formed in the inner wall of said U-shaped body defining said trough with said barbs increasing in width so as to reduce the width of said trough in the direction of the bottom thereof and with said barbs offset longitudinally of each other throughout the length of said trough so as to grip the cord as the same is depressed into said trough by the slidable movement of said arcuated wedge member relative thereto.

2. A strain relief bushing as defined by claim 1 including means formed on said wedge member to the rear of the inner ends of said tabs and adapted to coact with complementary means formed on the free ends of said U-shaped body for maintaining axial alignment of said U-shaped body and said wedge member when said parts are in an assembled condition.

3. A strain relief bushing as defined by claim 2 wherein said means formed on said wedge member to the rear of the inner ends of said tabs comprise laterally projecting detents adapted to cooperate with complementary means in the form of raised longitudinally extending ribs formed on the free ends of said U-shaped body.

4. A strain relief bushing as defined by claim 1 including means for retaining said U-shaped body in the circular aperture formed in the supporting panel, which means comprises a recess formed partially throughout the peripheral edge of said U-shaped body and an enlarged semi-annular collar, and means cooperating with said wing tabs of said wedge member within the circular aperture comprising a partial recess formed in said wedge member immediately forward of said wing tabs and an enlarged semiannular collar.

* * * * *